United States Patent [19]

Finestone

[11] Patent Number: 4,742,149
[45] Date of Patent: May 3, 1988

[54] PRODUCTION OF MELT CONSISTENT AROMATIC POLYESTERS

[75] Inventor: Arnold B. Finestone, Woodcliff Lake, N.J.

[73] Assignee: Dart Industries, Inc., Northbrook, Ill.

[21] Appl. No.: 732,863

[22] Filed: May 10, 1985

Related U.S. Application Data

[63] Continuation of Ser. No. 556,485, Nov. 30, 1983, abandoned.

[51] Int. Cl.$^4$ ..................... C08G 63/06; C08G 63/60
[52] U.S. Cl. .................................... 528/179; 528/176; 528/190; 528/191; 528/193; 528/194
[58] Field of Search ............... 528/125, 126, 128, 176, 528/179–182, 198, 191, 153, 194

[56] References Cited

U.S. PATENT DOCUMENTS 3,637,595  1/1972  Cottis et al. .................. 528/193
4,184,996  1/1980  Calundann .................... 528/190
4,375,530  3/1983  Hay et al. ..................... 528/190

FOREIGN PATENT DOCUMENTS 26315     1/1980   Chile .
31724     8/1980   Chile .
474-83    1/1982   Chile .
0000832A  2/1979   European Pat. Off. .
0026121A  4/1981   European Pat. Off. .
0035897   9/1981   European Pat. Off. .
0045499   2/1982   European Pat. Off. .
0048493A  3/1982   European Pat. Off. .
7211664   6/1982   Taiwan .
1353389   5/1974   United Kingdom .
1425795   2/1976   United Kingdom .
1520465   8/1978   United Kingdom .
1556231  11/1979   United Kingdom .
1594038   7/1981   United Kingdom .
2085458A  4/1982   United Kingdom .

Primary Examiner—Lucille M. Phynes
Attorney, Agent, or Firm—Jones & Askew

[57] ABSTRACT

The production of oxybenzoyl polyesters is facilitated by the incorporation of a salt, particularly an alkali earth metal salt, and preferably potassium sulfate, during the production enabling the consistent production from these polyesters of molded articles of improved appearance and excellent properties.

19 Claims, No Drawings

PRODUCTION OF MELT CONSISTENT AROMATIC POLYESTERS

This application is a continuation of application Ser. No. 556,485 filed 11/30/83, now abandoned.

BACKGROUND OF THE INVENTION

The present invention relates to an improved process for the production of copolyesters. More particularly, it relates to a process for the production of oxybenzoyl polyesters of aromatic dicarboxylic acids, dihydroxyphenols and p-hydroxybenzoic acid compounds as the starting materials.

It is known that such polyester resins can be produced by various polymerization processes including suspension polymerization and bulk polymerization. Of these, the bulk polymerization process is perhaps the most desirable process in terms of economy. However, since the aromatic polyesters have a high melting point as compared with aliphatic polyesters, such as polyethylene terephthalate, a higher temperature is required to maintain the aromatic polyesters at their molten state. Consequently, the polymers are often colored and deteriorated in performance.

Further, difficulty has been experienced in obtaining lot-to-lot consistency in molding characteristics of the resin. Obviously, variations in molding conditions are undesirable in commercial operations and can result in inefficiencies of operation and unacceptable differences in the molded articles.

Much effort has therefore been expended on the development of a process which eliminates the disadvantages discussed above and provides a polyester molding material from which articles of pleasing and uniform appearance and properties can be obtained.

THE INVENTION

According to the present invention, there can be consistently produced a polymer having an extremely low degree of discoloration and an excellent heat stability which has hitherto not been obtainable by the conventional bulk polymerization.

It is an object of the present invention to provide a process for the production of aromatic polyesters having an extremely low degree of discoloration and an excellent heat stability.

It is another object of the invention to provide an improved process for the consistent, economic production of aromatic polyesters of acceptable quality.

It is a further object of this invention to provide polyesters having reproducible melting and crystallization temperatures.

Other objects and further scope of the applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that a process overcoming the problems encountered in the practice of the prior art processes and providing polyester resins whose use is not attended by the noted drawbacks is provided by the improvement which comprises adding a salt, particularly an alkaline earth metal salt or an alkali salt and preferably potassium sulfate, during the preparation of the resin and, particularly to the prepolymer melt prior to advancement of the final product to the desired degree of polymerization.

The wholly aromatic polyesters towards whose production the present invention is directed consist of combinations of repeating units of one or more of the following formulae:

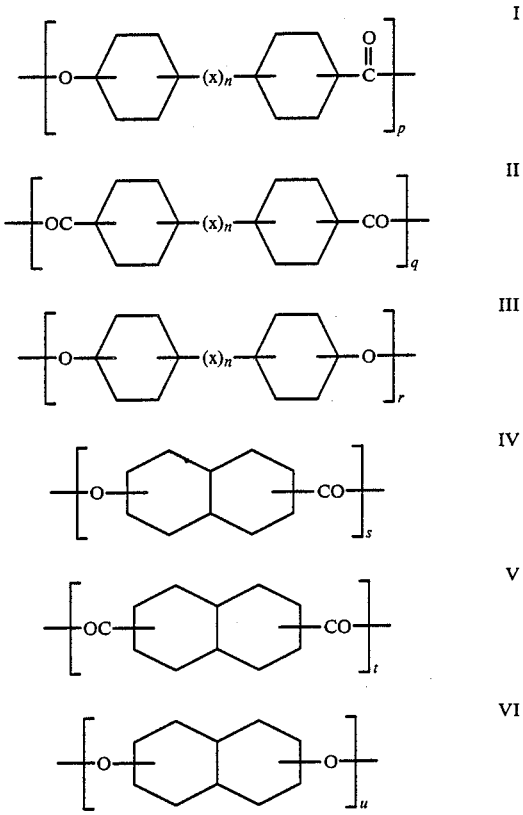

where x is O, S

NH or SO$_2$ and n is 0 or 1 and the total of the integers p+q+r+s+t+u in the moieties present is from about 3 to about 800.

Combinations of the above units include union of the carbonyl group of Formulae I, II, IV and V with the oxy group of Formulae I, III, IV and VI. In the most general combination all units of the above formulae can be present in a single copolymer. The simplest embodiment would be homopolymers of units I or IV. Other combinations include mixtures of units II and III, II and VI, III and V, V and VI, and I and IV.

The location of the functional groups are preferably in the para (1,4) positions. They can also be located in meta (1,3) position to each other. With respect to the naphthalene moiety, the most desirable locations of the functional groups are 1,4; 1,5 and 2,6. Such groups can also be in the meta position to each other.

The symbols p, q, r, s, t and u are integers and indicate the number of moieties present in the polymer. The total (p+q+r+s+t+u) can vary from 3 to 800 and, when present, the ratio of q/r, q/u, t/r, t/u,

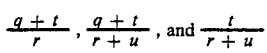

can vary from about 10/11 to about 11/10 with the most preferably ratio being 10/10.

Exemplary of materials from which the moieties of Formula I may be obtained are p-hydroxybenzoic acid, phenyl-p-hydroxybenzoate, p-acetoxybenzoic acid and isobutyl-p-acetoxybenzoate. Those from which the moiety of Formula II is derivable include terephthalic acid, isophthalic acid, diphenyl terephthalate, diethyl isophthalate, methylethyl terephthalate and the isobutyl half ester of terephthalic acid. Among the compounds from which the moiety of Formula III results are p,p'-bisphenol; p,p'-oxybisphenol; 4,4'-dihydroxybenzophenone; resorcinol and hydroquinone. Inspection will show which of these materials are also suitable for supplying the moieties of Formulae VI–VIII.

Examples of monomers represented by Formula IV are 6-hydroxy-1-naphthoic acid; 5-acetoxy-1-naphthoic acid and phenyl 5-hydroxy-1-naphthoate. Monomers representing Formula V include 1,4-naphthalenedicarboxylic acid; 1,5-naphthalenedicarboxylic acid and 2,6-naphthalenedicarboxylic acid. The diphenyl esters or dicarbonyl chlorides of these acids can also be used. Examples of monomers representative of Formula VI are 1,4-dihydroxynaphthalene; 2,6-diacetoxynaphthalene and 1,5-dihydroxynaphthalene.

Particularly preferred for use in the practice of the present invention are plastic materials based upon oxybenzoyl polyesters.

The oxybenzoyl polyesters useful in the present invention are generally those repeating units of Formula VI:

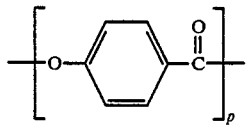

where p is an integer of from about 3 to about 600.

One preferred class of oxybenzoyl polyesters are those of Formula VII:

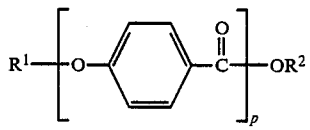

wherein $R^1$ is a member selected from the group consisting of benzoyl, lower alkanoyl, or preferably hydrogen; wherein $R^2$ is hydrogen, benzyl, lower alkyl, or preferably phenyl; and p is an integer from 3 to 600 and preferably 30 to 200. These values of p correspond to a molecular weight of about 1,000 to 72,000 and preferably 3,500 to 25,000. The synthesis of these polyesters is described in detail in U.S. patent application Ser. No. 619,577, filed Mar. 1, 1967, and now abandoned, entitled "Polyesters Based on Hydroxybenzoic Acids", the disclosure of which is incorporated herein by reference. This application is referred to in U.S. Pat. No. 3,668,300.

Another preferred class of oxybenzoyl polyesters are copolyesters of recurring units of Formulae VII, VIII and IX:

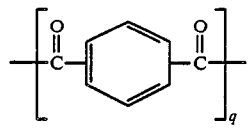

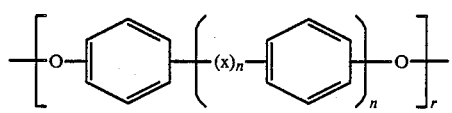

wherein X is —O— or —SO$_2$—; m is 0 or 1; n is 0 or 1; q:r=10:15 to 15:10; p:q=1:100 to 100:1; p+q+r=3 to 600 and preferably 20 to 200. The carbonyl groups of the moiety of Formula I or III are linked to the oxy groups of a moiety of Formula I or IV; the oxy groups of the moiety of Formula I or IV are linked to the carbonyl groups of the moiety of Formula I or III.

The preferred copolyesters are those of recurring units of Formula X:

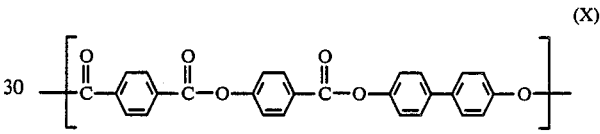

The synthesis of these polyesters is described in detail in U.S. Pat. No. 3,637,595, entitled "P-Oxybenzoyl Copolyesters", the disclosure of which is incorporated herein by reference.

The bulk condensation of aromatic polyesters is described in the patent literature and broadly considered involves an alkanoylation step in which a suitable dicarboxylic acid, hydroxybenzoic acid and diol are reacted with an acid anhydride, a prepolymerization step in the reaction product of the first step is polycondensed to prepare a prepolymer and the prepolymer is thereafter heated to produce a polycondensate of the desired degree of polymerization.

The polyesters useful in the present invention can also be chemically modified by various means such as by inclusion in the polyester of monofunctional reactants such as benzoic acid or tri- or higher functional reactants such as trimesic acid or cyanuric chloride. The benzene rings in these polyesters are preferably unsubstituted but can be substituted with non-interfering substituents, examples of which include among others halogen such as chlorine or bromine, lower alkoxy such as methoxy and lower alkyl such as methyl.

The salt can be an organic or an inorganic salt. However, the use of an alkaline earth metal salt is preferred. More particularly, the following salts can be employed: aluminum acetate, calcium acetate, calcium sulfate, copper acetate, magnesium acetate, magnesium terephthalate, potassium acetate, potassium chloride, potassium phosphate, sodium acetate, sodium sulfate and potassium bisulfate.

While the addition of the salt at any stage of the procedure is contemplated, it has been found to be particularly effective, and to provide markedly superior properties in the articles molded from the oxybenzoyl polyester resin, if the salt is added with the monomer charge.

The salt can be added as solid or as a solution at a temperature above the melting point of the salt. It is also possible to add the salt in a solution when incorporation is effected at a lower temperature.

Broadly, the salt has been added over a range of from about 25.0 parts per million to about 500 parts per million.

The exact mechanics by which the processability of the polyester and the appearance and properties of articles molded from the polyester is markedly enhanced by the addition of the defined salts is not fully understood. However, it has been observed that the retention of peak heights in repeated endothermic transitions and the achievement of consistent exothermic transitions is significantly and materially improved when the defined salts are employed in the processing of the polyesters.

The aromatic oxybenzoyl polyester polymers are known to display an endothermic transition which corresponds to a melting of the polyester. On cooling, an exothermic transition or crystallization occurs. Where a strong exotherm is observed, the transitions are described as reversible. Observations and the results described in later tables demonstrate that the addition of a salt, such as potassium sulfate, has greatly enhanced the reversibility of the peaks detected in the differential scanning calorimeter or DSC.

In determining the retention of peak height, the endotherm for the first and the second heating cycles are recorded on the same scale. The distances from base line to the maxima are determined and the height of the first cycle peak is divided by the height of the second cycle peak ($\times 100$). This value is expressed as "Percent Retention".

When the endotherms are measured on the aromatic oxybenzoyl polyesters which do not contain a salt, it has been found that in the second cycle peaks the onset of transition is difficult to define and the breadth or broadness of the heating curve makes it difficult to determine the peak. Thus, the change in temperature between the onset of transition and the occurrence of the maximum temperature is of a gradual nature, providing a heating curve which resembles a gently sloping or rounded hill. Such a peak is referred to in this specification and particularly in the Examples thereof as a broad or diffuse peak.

The second cycle peaks obtained in those instances where a salt has been incorporated in the processing of the aromatic polyesters in accordance with the present invention are sharp and clear with well defined temperature curves and in which the temperatures of the onset of transition and of peak maximum are easily determined.

The invention is illustrated by the following examples which are not to be construed as limiting the present invention, the scope of which is defined by the appended claims.

EXAMPLE 1

A reaction vessel was charged with 268 pounds of 4,4'-dihydroxy biphenyl, 396 pounds of p-hydroxybenzoic acid, 238 pounds of terephthalic acid, and 690 pounds of acetic anhydride. It was blanketed with nitrogen and heated with stirring to reflux which was continued for a minimum of three hours. Distillation with no return was then initiated and continued for about 5½ hours while the temperature of the reaction mixture was increased to 315° C. At this point, 0.71 pounds of distearyl pentaerythritol diphosphite was added and after 10 minutes the thick melt (93.3% conversion based on distillate yield) was poured into an insulated stainless steel tray and allowed to cool under a nitrogen blanket. It was then removed and ground (size <1.2 mm, 80% <0.5 mm). The yield of prepolymer after grinding is 90%.

The prepolymer was advanced by tumbling under nitrogen in a rotating oven. The prepolymer is heated from ambient temperature to 365° C. at a rate of 23° C./hr and cooled immediately. The resulting polymer is obtained as a free flowing powder.

EXAMPLE 2

The procedure of Example 1 was repeated exactly using the same materials and procedures with the single exception of the addition of 57 g of potassium sulfate to the reaction vessel with the monomers charge.

The DSC (Differential Scanning Calorimeter) endothermic and exothermic peaks for the first and second heating cycles were determined and are listed below in Table I.

TABLE I

|  | DSC Endotherm Peak Heating Cycle | | DSC Exotherm Onset Cooling Cycle | |
| --- | --- | --- | --- | --- |
|  | 1st | 2nd | 1st | 2nd |
| Example 1 | 410 | weak* | 366 | 355 |
| Example 2 | 421 | 419 | 381 | 381 |

*The peak recorded here is of a broad and diffuse nature and does not represent a sharp, clear-cut peak.

EXAMPLE 3

A reaction vessel was charged with 204.0 g (1.095 mole) of 4,4'-dihydroxy biphenyl, 301.1 g (2.18 moles) of p-hydroxybenzoic acid, 181.1 g (1.09 mole) of terephthalic acid, and 526.6 g (5.158 moles) of acetic anhydride, was blanketed with nitrogen and heated with stirring to reflux which was continued for a minimum of three hours. Distillation with no return was then initiated and continued for about 5½ hours while the temperature of the reaction mixture was increased to 315° C. At this point, 0.76 g of distearyl pentaerythritol diphosphite was added and after 10 minutes the thick melt (93.3% conversion based on distillate yield) was poured into a stainless steel beaker lined with aluminum foil and maintained at 300° C. The prepolymer was kept under a nitrogen blanket at 300° C. for 20 hours, then removed, allowed to cool and ground (size <1.2 mm, 80% <0.5 mm). The yield of prepolymer after grinding is 90%.

The prepolymer was advanced by tumbling under nitrogen in an aluminum drum which is rotated in an oven. The prepolymer is heated from 204° to 354° C. and maintained at the higher temperature for one hour. On cooling, the resulting polymer is obtained as a free flowing powder.

EXAMPLE 4

The procedure of Example 1 was repeated exactly using the same materials and procedures with the single exception of the addition of 0.067 g of potassium sulfate to the reaction vessel with the monomers charge.

The DSC (Differential Scanning Calorimeter) endothermic peaks for the first and second heating cycles were determined and are listed below, together with the percent retention of the endothermic peak height, in Table II.

TABLE II

| | Percent Retention of Endo Peak Ht | DSC Endotherm Peak Heating Cycle | |
|---|---|---|---|
| | | 1st | 2nd |
| Example 3 | 34 | 422 | 417* |
| Example 4 | 107 | 416 | 429 |

*The peak recorded here is of a broad and diffuse nature and does not represent a sharp, clear-cut peak.

Similar comparisons were made for several other polyesters, the control being prepared in accordance with the procedure of Example 1 and the potassium sulfate-containing polyester being prepared in accordance with the procedure of Example 2. The results are listed in Table III below.

TABLE III

| | K2SO4 Added ppm | Percent Retention of Endo Peak Ht | DSC Endotherm Peak Heating Cycle | |
|---|---|---|---|---|
| | | | 1st | 2nd |
| Example 5 | 0 | 27 | 414 | 412* |
| Example 6 | 110 | 71 | 414 | 422 |
| Example 7 | 0 | 40 | 418 | 417* |
| Example 8 | 110 | 75 | 422 | 426 |

*The peak recorded here is of a broad and diffuse nature and does not represent a sharp, clear-cut peak.

As demonstrated, the salt-containing polyester showed a significantly improved percent retention of endothermic peak height.

Comparisons are provided in Table IV between controls prepared in accordance with Example 1 and salt-containing polyesters prepared in accordance with Example 2. The same control was used in Examples 10, 12, 16, 20 and 22 but is set forth separately in order to provide more immediate comparison with the polyesters of Examples 9, 11, 15, 19 and 21.

TABLE IV

| | Salt | PPM of Cation | Percent Retention |
|---|---|---|---|
| Ex. 9 | Aluminum Acetate | 98 | 50 |
| Ex. 10 | Control | 0 | 22 |
| Ex. 11 | Calcium Acetate | 152 | 35 |
| Ex. 12 | Control | 0 | 22 |
| Ex. 13 | Copper Acetate | 84 | 84 |
| Ex. 14 | Control | 0 | 32 |
| Ex. 15 | Magnesium Acetate | 126 | 86 |
| Ex. 16 | Control | 0 | 22 |
| Ex. 17 | Potassium Chloride | 100 | 70 |
| Ex. 18 | Control | 0 | 18 |
| Ex. 19 | Sodium Acetate | 73 | 38 |
| Ex. 20 | Control | 0 | 22 |
| Ex. 21 | Sodium Sulfate | 73 | 38 |
| Ex. 22 | Control | 0 | 22 |

Similar significant improvements in the percent retention as compared to controls having broad or diffuse second cyclic peaks were obtained when the following salts were employed in lieu of those salts specifically recited in Table III; calcium sulfate, magnesium terephthalate, potassium acetate, potassium phosphate and potassium bisulfate.

EXAMPLE 23

A reaction vessel was charged with 344.5 pounds of 4,4'-dihydroxy biphenyl, 514.0 pounds of p-hydroxybenzoic acid, 309.0 pounds of terephthalic acid, 896.0 pounds of acetic anhydride, and 57.0 grams of potassium sulfate. It was blanketed with nitrogen and heated with stirring to reflux which was continued for a minimum of three hours. Distillation with no return was then initiated and continued for about 5½ hours while the temperature of the reaction mixture was increased to 315° C. At this point, 416.0 grams of distearyl pentaerythritol diphosphite was added and after 10 minutes the thick melt (93.3% conversion based on distillate yield) was poured into an insulated stainless steel tray, blanketed with nitrogen and allowed to cool. It was then removed and ground (size <1.2 mm, 80% <0.5 mm).

The prepolymer was advanced by tumbling under nitrogen in a rotating oven. The prepolymer is heated from ambient temperature to 365° C. and cooled immediately. The resulting polymer is obtained as a free flowing powder. The polymer is characterized by first and second endotherm peaks of 416° and 418° and by first and second exotherm points of 377° and 379°.

EXAMPLE 24

A series of 65 runs was made in which polyesters were prepared according to the procedure of Example 33, employing 93 parts per million of potassium sulfate based on the final polymer. The mean average exotherm onset on first cycle was determined to be 377.8° and the mean average exotherm onset for second cycle was determined to be 378.4°. The closeness of these points is extremely significant in relation to consistency and reproducibility in injection molding operations. The products obtained on the injection molding of the polyesters were of high quality.

In the Tables set forth above the amount of salt used is based upon parts per million in the finished polymer.

In the above Examples and in the appended claims, the term "advancing" is to be understood as polymerization in the solid state.

What is claimed is:

1. A melt-processable wholly aromatic polyester having reproducible melting and crystallization temperatures;
   said polyester having been made by bulk polymerization, including heat condensing wholly aromatic precursors to form a prepolymer in the presence of an alkali or alkaline earth metal salt, and advancing the prepolymer to the required degree of polymerization;
   said metal salt being added in an amount effective to render said melting and crystallization temperatures substantially reproducible with respect to melt processing of said polyester; and
   said polyester being an oxybenzoyl polyester which comprises recurrent moieties of the following formulas:

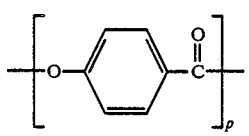 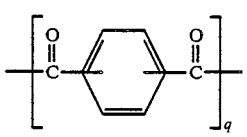

VII        VIII

-continued

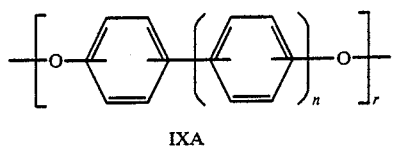

IXA where n is zero or one; q:r is about 10:15 to 15:10; p:(q+r) is greater than about 1:4; p+q+r is about 5 to 600; the carbonyl groups of the moiety of formula VII or VIII are linked to the oxy groups of the moiety of formula VII or IXa; and the oxy groups of the moiety of formula VII or IXa are linked to the carbonyl groups of the moiety of formula VII or VIII.

2. An injection molded article comprising the aromatic polyester of claim 1.

3. The polyester of claim 1 wherein the precursors comprise an aromatic dicarboxylic acid, a hydroxycarboxylic acid and an aromatic diol.

4. The polyester of claim 3 wherein said precursors comprise terephthalic acid, hydroxybenzoic acid and dihydroxybiphenyl.

5. The polyester of claim 3 wherein condensation of said precursors is by alkanoylation with an acid anhydride.

6. The polyester of claim 4 wherein the molar ratios of said precursors are about 1:2:1, respectively.

7. The polyester of claim 1 wherein said melting temperature is at least about 378° C.

8. The polyester of claim 1 wherein said metal salt is added in the amount of about 0.0025 to 0.05% by weight.

9. The polyester of claim 1 wherein said metal salt is added with the precursor charge.

10. The polyester of claim 1 wherein said metal salt is an inorganic salt of potassium or magnesium.

11. The polyester of claim 10 wherein said metal salt is a sulfate or chloride.

12. The polyester of claim 11 wherein said metal salt is potassium sulfate.

13. A melt-processable wholly aromatic polyester having reproducible melting and crystallization temperatures;

said polyester having been made by bulk polymerization, including heat condensing wholly aromatic precursors to form a prepolymer in the presence of an alkali or alkaline earth metal salt, and advancing the prepolymer to the required degree of polymerization;

said precursors being an aromatic dicarboxylic acid, a hydroxycarboxylic acid, and an aromatic diol;

said metal salt being an inorganic salt of potassium or magnesium;

said metal salt being added with the charge of precursors, in an amount effective to render said melting and crystallization temperatures substantially reproducible with respect to melt processing of said polyester and within the range of about 0.0025 to 0.05% by weight; and said polyester being an oxybenzoyl polyester which comprises recurrent moieties of the following formulas:

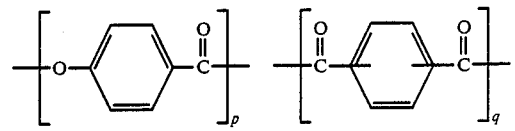

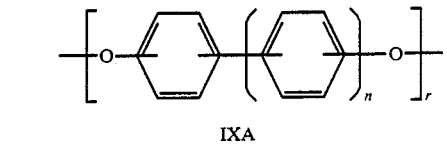

IXA where n is zero or one; q:r is about 10:15 to 15:10; p:(q+r) is greater than about 1:4; p+q+r is about 5 to 600; the carbonyl groups of the moiety of formula VII or VIII are linked to the oxy groups of the moiety of formula VII or IXa; and the oxy groups of the moiety of formula VII or IXa are linked to the carbonyl groups of the moiety of formula VII or VIII.

14. A melt-processable wholly aromatic polyester having reproducible melting and crystallization temperatures;

said polyester having been made by bulk polymerization, including heat condensing wholly aromatic precursors to form a prepolymer in the presence of an alkali or alkaline earth metal salt, and advancing the prepolymer to the required degree of polymerization;

said precursors being terephthalic acid, hydroxybenzoic acid and dihydroxybiphenyl;

said metal salt being a sulfate or chloride of potassium or magnesium;

said metal salt being added with the charge of precursors, in an amount effective to render said melting and crystallization temperatures substantially reproducible with respect to injection molding of said polyester and within the range of about 0.0025 to 0.05% by weight;

said polyester having a melting temperature of at least about 378° C.; and said polyester being an oxybenzoyl polyester which comprises recurrent moieties of the following formulas:

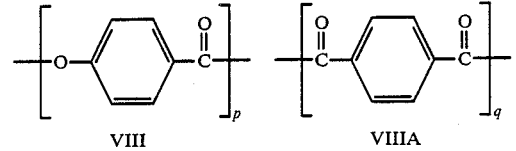

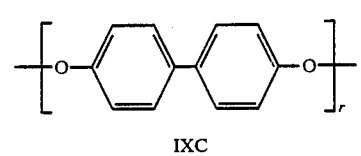

IXC where q:r is about 10:15 to 15:10; p:(q+r) is greater than about 1:4; p+q+r is about 5 to 600; the carbonyl groups of the moiety of formula VII or VIIIa are linked to the oxy groups of the moiety of formula VII or IXc; and the oxy groups of the moiety of formula VII or IXc are linked to the carbonyl groups of the moiety of formula VII or VIIIa.

15. An injection molded article comprising the aromatic polyester of claim 14.

16. A process for making a melt-processable wholly aromatic polyester having reproducible melting and crystallization temperatures, comprising:
heat condensing, in bulk, wholly aromatic precursors to form a prepolymer in the presence of an alkali or alkaline earth metal salt; and linked to the oxy groups of the moiety of formula VII or IXa; and the oxy groups of the moiety of formula VII or IXa are linked to the carbonyl groups of the moiety of formula VII or VIII.

17. The polyester of claim 14 wherein the molar ratios of said precursors are about 1:2:1, respectively.

18. The polyester of claim 14 wherein condensation of said precursors is by alkanoylation with an acid anhydride.

19. The polyester of claim 13 wherein condensation of said precursors is by alkanoylation with an acid anhydride.

* * * * *

UNITED STATES PATENT AND TRADEMARK OFFICE
CERTIFICATE OF CORRECTION

PATENT NO. : 4,742,149
DATED : May 3, 1988
INVENTOR(S) : Arnold B. Finestone

It is certified that error appears in the above-identified patent and that said Letters Patent is hereby corrected as shown below:

In claim 16 at column 11, line 10, after "and", insert the following:

-- advancing the prepolymer to the required degree of polymerization;

said precursors being an aromatic dicarboxylic acid, a hydroxycarboxylic acid, and an aromatic diol, and wherein condensation of said precursors is by alkanoylation with an acid anhydride;

said metal salt being an inorganic salt of potassium or magnesium;

said metal salt being added with the charge of precursors, in an amount effective to render said melting and crystallization temperatures substantially reproducible with respect to melt processing of said polyester and within the range of about 0.0025 to 0.05 % by weight; and said polyester being an oxybenzoyl polyester which comprises recurrent moieties of the following formulas:

UNITED STATES PATENT AND TRADEMARK OFFICE
CERTIFICATE OF CORRECTION

PATENT NO. : 4,742,149
DATED : May 3, 1988
INVENTOR(S) : Arnold B. Finestone

It is certified that error appears in the above-identified patent and that said Letters Patent is hereby corrected as shown below:

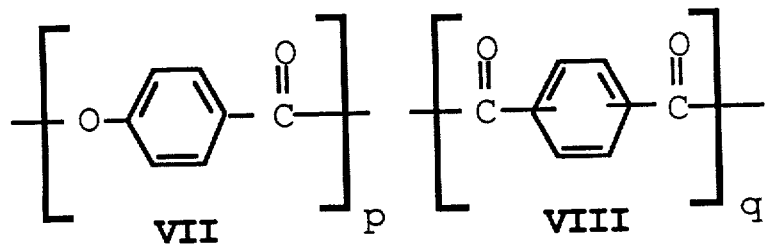

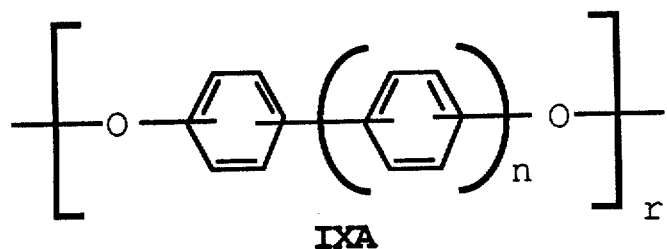

where n is zero or one; q:r is about 10:15 to 15:10; p:(q + r) is greater than about 1:4; p + q + r is about 5 to 600; the carbonyl groups

UNITED STATES PATENT AND TRADEMARK OFFICE
CERTIFICATE OF CORRECTION

PATENT NO. : 4,742,149 Page 3 of 3

DATED : May 3, 1988

INVENTOR(S) : Arnold B. Finestone

It is certified that error appears in the above-identified patent and that said Letters Patent is hereby corrected as shown below:

of the moiety of formula VII or VIII are --.

Signed and Sealed this

Fourteenth Day of February, 1989

*Attest:*

DONALD J. QUIGG

*Attesting Officer*     *Commissioner of Patents and Trademarks*